(12) United States Patent
Kontermann et al.

(10) Patent No.: US 11,167,611 B2
(45) Date of Patent: Nov. 9, 2021

(54) WHEEL SUSPENSION

(71) Applicant: ZF Friedrichshafen AG, Friedrichshafen (DE)

(72) Inventors: Peter Kontermann, Osnabrück (DE); Alexander Neu, Friedrichshafen (DE); Andreas Pasch, Shanghai (CN); Alfons Nordloh, Visbek (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 25 days.

(21) Appl. No.: 16/636,525

(22) PCT Filed: Jul. 2, 2018

(86) PCT No.: PCT/EP2018/067760
§ 371 (c)(1),
(2) Date: Feb. 4, 2020

(87) PCT Pub. No.: WO2019/029909
PCT Pub. Date: Feb. 14, 2019

(65) Prior Publication Data
US 2021/0178844 A1    Jun. 17, 2021

(30) Foreign Application Priority Data
Aug. 8, 2017    (DE) .................... 10 2017 213 799.1

(51) Int. Cl.
*B60G 7/00*    (2006.01)
(52) U.S. Cl.
CPC ............. *B60G 7/008* (2013.01); *B60G 7/001* (2013.01); *B60G 2204/148* (2013.01);
(Continued)

(58) Field of Classification Search
CPC ........ B60G 2204/421; B60G 2204/418; B60G 2204/148; B60G 2206/8207; B60G 7/001;
(Continued)

(56) References Cited

U.S. PATENT DOCUMENTS 3,152,846 A * 10/1964 Dumpis ................... B62D 7/16
                                                         384/220
5,024,283 A *  6/1991 Deli ................... B62D 33/0604
                                                         180/89.14
(Continued)

FOREIGN PATENT DOCUMENTS

DE    10 2009 023 362 A1    12/2010
DE    10 2013 216 029 A1     2/2015
(Continued)

OTHER PUBLICATIONS

International Search Report Corresponding to PCT/EP2018/067760 dated Oct. 9, 2018.
(Continued)

*Primary Examiner* — Paul N Dickson
*Assistant Examiner* — Maxwell L Meshaka
(74) *Attorney, Agent, or Firm* — Finch & Maloney, PLLC; Michael J. Bujold; Jay S. Franklin

(57) ABSTRACT

A wheel suspension having at least one chassis suspension link, a first track rod and a second track rod. A deflecting lever connects the first track rod and the second track rod to one another and the deflecting lever is mounted on the at least one chassis suspension link. To produce a simple structure of the bearing system, the bearing system is in the form of a slide bearing which is accommodated by a bearing section of the at least one chassis suspension link, in which a fastener, that connects the deflecting lever and the at least one chassis suspension link, is fitted.

10 Claims, 3 Drawing Sheets

(52) U.S. Cl.
CPC .. *B60G 2204/418* (2013.01); *B60G 2204/421* (2013.01); *B60G 2206/7104* (2013.01); *B60G 2206/8207* (2013.01)

(58) Field of Classification Search
CPC . B60G 7/008; B62D 7/16; B62D 7/06; B62D 7/18; F16C 11/045
See application file for complete search history.

(56) References Cited

U.S. PATENT DOCUMENTS

| | | | |
|---|---|---|---|
| 8,376,648 B2* | 2/2013 | Marshall | F16C 11/045 |
| | | | 403/161 |
| 9,598,103 B1* | 3/2017 | Langenfeld | B62D 3/126 |
| 10,414,224 B2 | 9/2019 | Neu et al. | |
| 2010/0202716 A1* | 8/2010 | Kaneko | B60G 15/068 |
| | | | 384/368 |
| 2015/0042059 A1* | 2/2015 | Fiechtner | F16F 1/3842 |
| | | | 280/124.177 |

FOREIGN PATENT DOCUMENTS

| | | |
|---|---|---|
| DE | 10 2015 209 580 A1 | 12/2016 |
| DE | 10 2015 209 844 A1 | 12/2016 |
| DE | 10 2015 209 850 A1 | 12/2016 |
| EP | 1 900 554 A1 | 3/2008 |

OTHER PUBLICATIONS

Written Opinion Corresponding to PCT/EP2018/067760 dated Oct. 9, 2018.

* cited by examiner

WHEEL SUSPENSION

This application is a National Stage completion of PCT/EP2018/067760 filed Jul. 2, 2018, which claims priority from German patent application serial no. 10 2017 213 799.1 filed Aug. 8, 2017.

FIELD OF THE INVENTION

The invention relates to a wheel suspension which comprises at least one chassis suspension link, at least one first track rod and a second track rod, a deflecting lever and a bearing system. The bearing system serves to mount the deflecting lever, which connects the first track rod and the second track rod to one another, on the at least one chassis suspension link.

BACKGROUND OF THE INVENTION

The design of a wheel suspension on the steerable axle of a motor vehicle determines the steering angle that can be realized, and until now it has been possible to produce wheel steering angles of up to ±50°. By far the majority of known wheel suspensions enable a steering angle of up to ±40° at the wheel on the inside of a curve, but this is associated with a distinct restriction of the turning circle.

To enable steering angles larger than ±50°, the complexity of the chassis kinematics is increased since additional components are required for that. These additional components are supported on the vehicle body or the chassis suspension links.

From DE 10 2015 209 850 A1 a wheel suspension is known, which comprises at least one chassis suspension link, at least one first track rod and a second track rod, and a deflecting lever. In this case a bearing system mounts the deflecting lever, which connects the first track rod and the second track rod to one another, on the at least one chassis suspension link. For this, the bearing system is formed by two tapered roller bearings arranged adjacent to one another, which are accommodated by the chassis suspension link in a bearing section made for the purpose in order to mount the deflecting lever by means of an undulating section formed thereon in the tapered roller bearings. The bearing section of the chassis suspension link must in that case be designed specially to accommodate the tapered roller bearings.

SUMMARY OF THE INVENTION

Starling from the above-described prior art, it is now the purpose of the present invention to propose a wheel suspension whose bearing system that serves to mount the deflecting lever on the chassis suspension link is characterized by a simple structure which is less costly.

This objective is achieved by the wheel suspension, starting from the preamble of the independent claim(s), in combination with its characterizing features. The respective later, dependent claims in each case describe advantageous further developments.

According to the invention, in a wheel suspension comprising at least one chassis suspension link, a first track rod and a second track rod, and a deflecting lever, the deflecting lever that connects the first and the second track rods to one another being mounted by means of a bearing system on the at least one chassis suspension link. In this case it is provided that the mounting only has exactly one degree of freedom, namely to enable rotation of the components.

For this, the wheel suspension according to the invention is in the form of a bearing system designed as a slide bearing, which is accommodated by a bearing section of the at least one chassis suspension link in which a connection means that connects the deflecting lever and the at least one chassis suspension link is fitted. In this case the bearing system is made as a type of hinge, which supports the axial and radial forces and torques that occur. The slide bearing has only the one necessary degree of freedom that only enables rotation of the components connected to one another. Compared with a roller bearing, the slide bearing has fewer moving components and can therefore be produced more inexpensively. In addition, thanks to the provision of separate fastener that connect the chassis suspension link to the deflecting lever, the production of the deflecting lever is simplified. The bearing system also has a lower breakaway torque and is designed advantageously having regard to the only limited existing fitting space for the wheel suspension.

The use of two tapered roller bearings as in the bearing system of DE 10 2015 209 850 A1, due to their arrangement, requires a more elaborate design of the chassis suspension link and the deflecting lever and since roller bearings are used, it is more expensive.

In accordance with an embodiment of the invention, the slide bearing can comprise a two-part bearing bush with a first and a second bearing bush component. The two bearing bush components can be arranged in the bearing section in a through-going bore of the at least one chassis suspension link that is inclined relative to the longitudinal axis thereof.

Particularly preferably, the first and the second bearing bush components can be prestressed against one another.

For this, the first and the second bearing bush components can have, at one end in each case, a section extending radially outward, which rests in contact with a respective step in the bearing section. The bearing bush sections are arranged in the through-bore in such manner that the parts of the respective bearing bush sections extending radially outward are positioned facing away from one another. The step is produced by an abrupt diameter increase of the through-bore, To prestress the bearing bush components inserted into the through-bore, wall sections of the bearing section of the chassis suspension link which in each case delimit the through-bore are rolled or bent over inward in part. Since the respective rolled-over wall section in each case overlaps the radially outward extending part of the corresponding bearing bush component, the latter are secured in the axial direction. Moreover, in that way a prestressing of the bearing bush components can be produced.

According to an embodiment the bearing bush can consist of a thermoplastic. Thermoplastic materials can be notable for low coefficients of friction and high wear resistance. To produce the bearing bush, for example polyethylene (PE) or polyoxymethylene (POM) can be used as the plastic. Thus, the first and second bearing bush components can be made as plastic semifabricates for the subsequent assembly process.

In an embodiment of the invention, the fastener can comprise a sleeve which has on its outer surface an all-round step located essentially in the middle, and a securing screw that can be inserted through the sleeve. The first bearing bush component and the second bearing bush component can be in contact at their end with the all-round step. This must be done without any play. By virtue of the step, axial forces absorbed by the sleeve can be transmitted to the first and second bearing bush components. By means of the securing screw that can be passed through the sleeve, the deflecting lever and the chassis suspension link can be connected to one another. For that purpose the deflecting lever in particular has a threaded bore which corresponds with the threaded section of the securing screw. The securing screw prevents any axial movement of the sleeve relative to the bearing section of the chassis suspension link.

According to a further embodiment the fastener can be made as one piece, which comprises a bearing segment and a connecting segment. The bearing segment is located between the first and second bearing bush components. In that case the bearing segment can also have on its outer surface an all-round step arranged essentially in the middle, against which the first and second bearing bush components are supported in order to absorb axial forces.

In a further embodiment the bearing segment can have an essentially flange-shaped section, which is in some parts in contact with a section of the first bearing bush component that extends radially outward. In that way the design of the bearing section of the chassis suspension link can be simplified, if the radially outward extending section of the first bearing bush component is supported on the surface of the chassis suspension link. Thereby, a recess in the bearing section and the rolling or bending over of the wall section can be omitted.

Furthermore, on the bearing segment, on its side facing away from the essentially flange-shaped section, an essentially annular element can be fitted, which is in contact with the radially outward extending section of the second bearing bush component. To secure the annular element against movement in the axial direction, a circlip can be fitted on the connecting element. Some alternative self-securing fixing means is also conceivable. The connecting segment has an externally threaded section which can preferably be connected to a corresponding internally threaded section in the deflecting lever. For this, the bearing segment can be made hollow-cylindrical in part and can have a tool engagement aperture. In this embodiment the first and second bearing bush components are prestressed by the fastener and the annular element.

The invention is not limited to the indicated combination of features in the independent claims or the claims that depend on them. There are possibilities for combining individual features with one another, provided that they emerge from the claims, the description of preferred embodiments of the invention given below, or directly from the drawings. References in the claims to the drawings by the use of indexes is not intended to restrict the protective scope of the claims.

BRIEF DESCRIPTION OF THE DRAWINGS

Advantageous embodiments of the invention, which will be explained below, are illustrated in the drawings, which show.

DETAILED DESCRIPTION OF THE PREFERRED EMBODIMENTS

Figure 1:
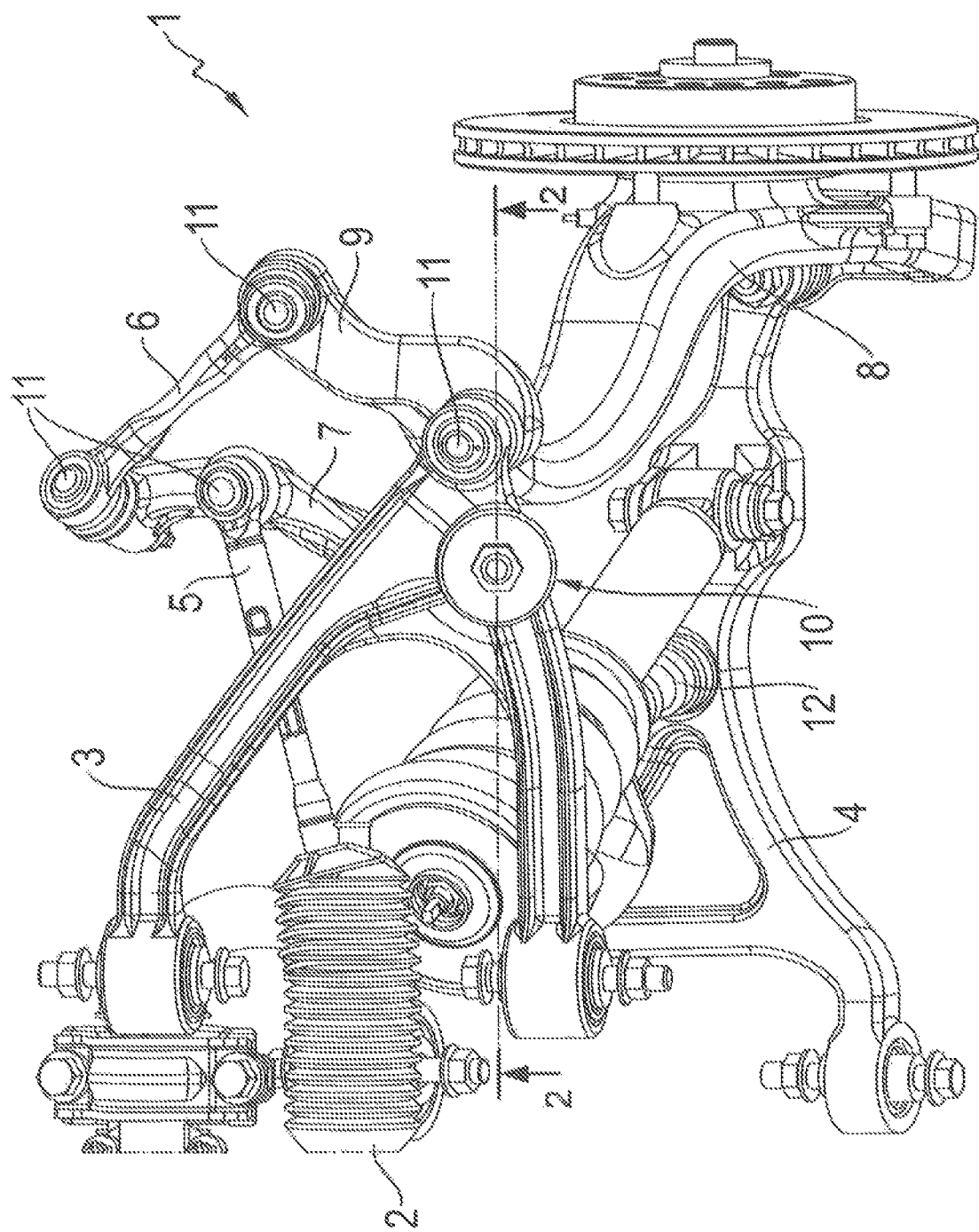
FIG. 1: A schematic representation of a wheel suspension with a bearing system.

FIG. 1 shows a schematic representation of a wheel suspension 1 with a bearing system 10. The wheel suspension 1 has a steering system 2 in the form of a toothed rack mechanism. In addition the wheel suspension 1 comprises an upper chassis suspension link 3 and a lower suspension link 4 which are in the form of wishbone transverse links, a first track rod 5 and a second track rod 6, a deflecting lever 7, a wheel carrier 8 and a connecting section 9. The upper chassis suspension link 3 and the lower suspension link 4 can also be non-integral wishbone transverse links.

The first track rod 5 is connected to the steering system 2 end by way of an articulated joint 11 to the deflecting lever 7. At one end the deflecting lever is connected by an articulated joint 11 to the second track rod 6. At its other end the deflecting lever 7 is mounted on the upper chassis suspension link 3 by way of the bearing system 10. The articulated joint 11, which connects the first track rod 5 to the deflecting lever 7, is arranged between the bearing system 10 and the articulated joint 11 of the second track rod 6. The second track rod 6 is connected to the connecting section 9 by an articulated joint 11. The wheel carrier 8 and the connecting section 9 are made integrally, in one piece. By means of respective articulated joints 11 the wheel carrier 8 is connected to the upper chassis suspension link 3 and the lower chassis suspension link 4. On the lower chassis suspension link 4 is arranged a spring damper 12.

Figure 2:
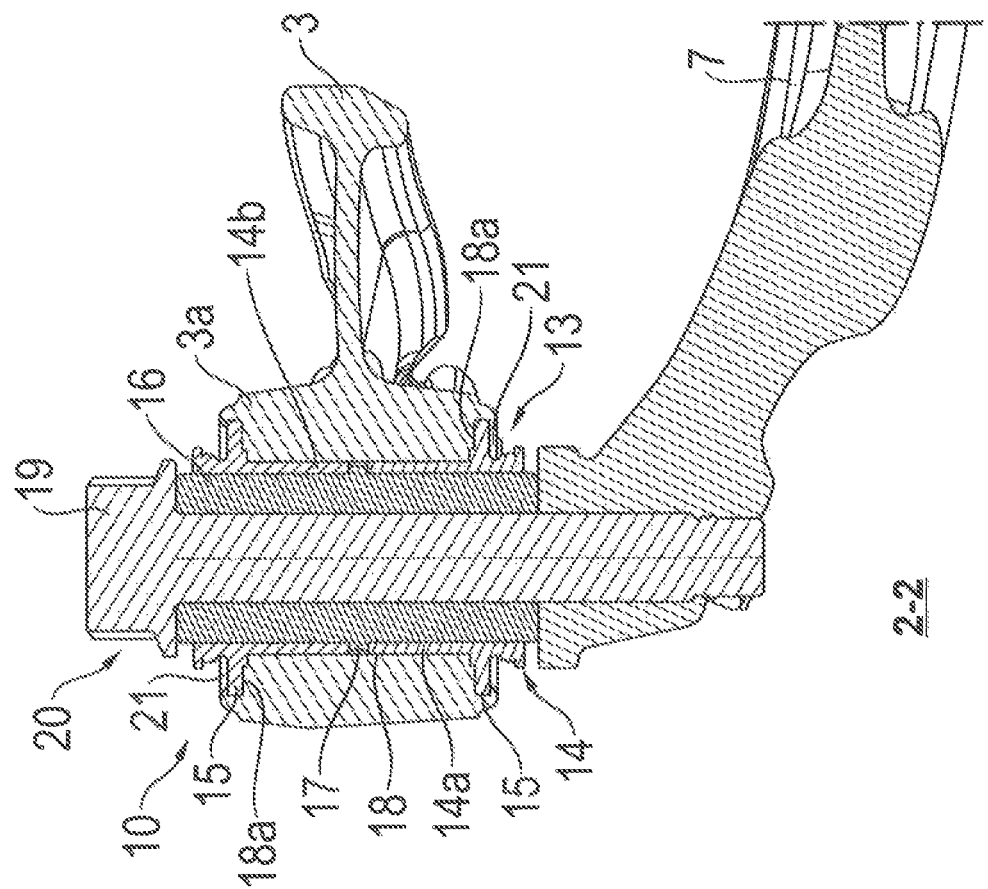
FIG. 2: A sectioned view along the line 2-2 in FIG. 1.

FIG. 2 shows a sectioned view along the line 2-2 in FIG. 1. This view shows the bearing system 10 according to a first embodiment. The bearing system 10, which mounts the deflecting lever 7 on the upper chassis suspension link 3, has exactly one degree of freedom. For this, the bearing system 10 is made as a slide bearing 13. The slide bearing 13 comprises a two-part bearing bush 14 with a first bearing bush component 14a and a second bearing bush component 14b. The first bearing bush component 14a and the second bearing bush component 14b are accommodated in a through-going bore 18 that extends through the upper chassis suspension link 3. At each end the through-bore 18 has an abrupt diameter increase, so that in each case a step 18a is formed. The first and the second bearing bush components 14a, 14b have, respectively, a section 15 that extends outward in the radial direction. In the assembled position these sections 15 rest, without play, against the respectively corresponding steps 18a of the upper chassis suspension link 3. The two-part bearing bush 14 consists of a thermoplastic plastic material characterized by a low coefficient of friction and high wear resistance. For this, for example polyethylene (PE) or polyoxymethylene (POM) can be used as the plastic. The first and second bearing bush components 14a, 14b can be provided in the form of plastic semifabricates for the subsequent assembly process.

In the bearing bush 14 is fitted a fastener 20, which connects the deflecting lever 7 and the upper chassis suspension link 3 to one another. In the embodiment shown the multi-component fastener 20 comprises a sleeve 16 and a securing screw 19. The sleeve 16 is made of metal but can also be made of a plastic. On its outer surface the sleeve 16 has an all-round ridge 17 arranged essentially in the middle. In contact with this ridge 17 are arranged the first bearing bush component 14a and the second bearing bush component 14b opposite one another. The first bearing bush component 14a and the second bearing bush component 14b rest against the ridge 17 with no play. In that way the first bearing bush component 14a and the second bearing bush component 14b secure the sleeve 16 against axial displacement. The all-round ridge 17 on the outer surface of the sleeve 16 absorbs axial forces and transmits them. By means of the securing screw 19 the upper chassis suspension link 3 is screwed to the deflecting lever 7.

During the assembly of the bearing system 10, first one of the two bearing bush components 14a or 14b is inserted into the through-bore 18. Then, the sleeve 16 is inserted into the bearing bush component 14a or 14b already inserted into the through-bore 18. For the axial fixing of the first and second bearing bush components 14a, 14b it is provided that axially extending wall sections 21 of the upper chassis suspension link 3, which delimit the through-bore 18 at each respective end, are rolled or bent over so that they overlap the respective sections 15. Furthermore, in this way a prestress is applied on the first and second bearing bush components 14a, 14b. To seal the bearing system 10 at least one corrugated seal (not shown) is provided. The at least one corrugated seal seals the bearing system 10 holding the deflecting lever 7 onto the upper chassis suspension link 3 against the surroundings.

Figure 3:
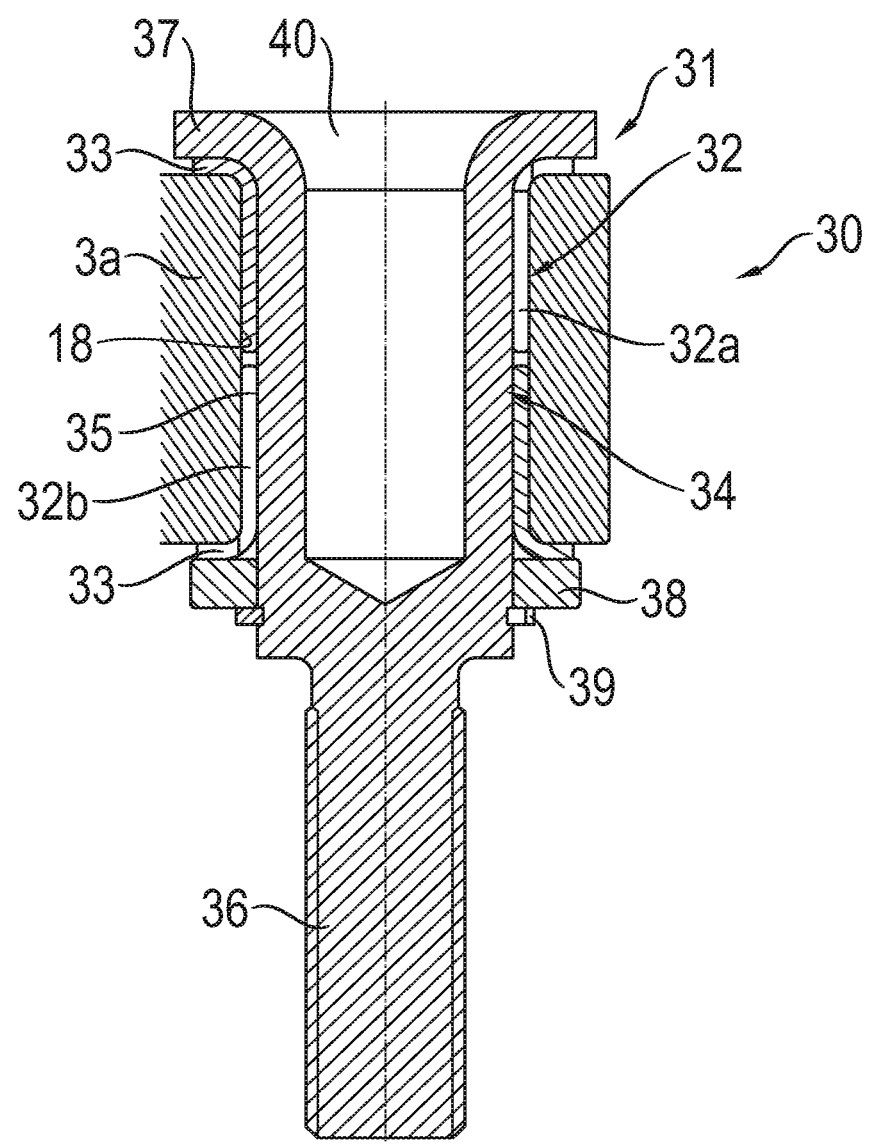
FIG. 3: A schematic view of a bearing system according to a second embodiment.

FIG. 3 shows a schematic view of a bearing system 30 according to a second embodiment. The bearing system 30 is also designed as a slide bearing 31. The slide bearing 31 comprises a two-part bearing bush 32 with a first bearing bush component 32a and a second bearing bush component 32b. The first and second bearing bush components 32a, 32b are accommodated by the through-bore 18 extending through the upper chassis suspension link 3. The first and second bearing bush components 32a, 32b have in each case radially outward-extending sections 33 at one end. With their respective sections 33 the first bearing bush component 32a and the second bearing bush component 32b rest in contact with the chassis suspension link 3.

To connect the chassis suspension link 3 and the deflecting lever 7, a fastener 34 is located in the two-part bearing bush 32. The fastener 34 comprises a bearing segment 35 and a connecting segment 36. The bearing segment 35 has at its free end a flange-shaped section 37 which projects axially and radially beyond the section 33 of the first bearing bush component 32a and is in contact therewith. On the opposite side of the section 37 an annular element 38 can be pushed over the connecting segment 36 onto the bearing segment 35. The annular element 38 rests in part against the radially outward-extending section 33 of the second bearing bush component 32b. By means of a securing element such as a circlip 39 fitted on the bearing segment 35, the fastener 34 is secured against axial displacement. The connecting segment 36 is provided with an external thread so that the fastener 34 can be screwed into the deflecting lever 7. For this, in the bearing segment 35 a tool engagement aperture 40 is provided, so that the fastener 34 can be screwed into a corresponding internal thread in the deflecting lever 7.

INDEXES

1 Wheel suspension
2 Steering system
3 Upper chassis suspension fink
3a Bearing section
4 Lower suspension link
5 First track rod
6 Second track rod
7 Deflecting lever
8 Wheel carrier
9 Connecting section
10 Bearing system
11 Articulated joint
12 Spring damper
13 Slide bearing
14 Bearing bush
14a First bearing bush component
14b Second bearing bush component
15 Section
16 Sleeve
17 Ridge
18 Through-bore
18a Step
19 Securing screw
20 Fastener
30 Bearing system
31 Slide bearing
32 Bearing bush
32a First bearing bush component
32b Second bearing bush component
33 Section
34 Fastener
35 Bearing segment
36 Connecting segment
37 Section
38 Annular element
39 Circlip
40 Tool engagement aperture

The invention claimed is:

1. A wheel suspension comprising:
at least one chassis suspension link,
a first track rod,
a second track rod, and
a deflecting lever connecting the first track rod and the second track rod to one another and being mounted on the at least one chassis suspension link,
a bearing system being in a form of a slide bearing which is accommodated by a bearing section of the at least one chassis suspension link, and
a fastener connecting the deflecting lever to the at least one chassis suspension link, a first end portion of the fastener being fitted inside a slide bearing while a second opposed end portion of the fastener directly engaging with the deflecting lever for connecting the deflecting lever to the at least one chassis suspension link, and the slide bearing comprises a two-component bearing bush with a first bearing bush component and a second bearing bush component.

2. The wheel suspension according to claim 1, wherein the first bearing bush component and the second bearing bush component are prestressed against one another.

3. The wheel suspension according to claim 1, wherein the first bearing bush component and the second bearing bush component each have a respective a section, at one end thereof, extending radially outward, each of which is in contact with a step in the bearing section.

4. The wheel suspension according to claim 1, wherein the bearing bush is made from a thermoplastic material.

5. The wheel suspension according to claim 1, wherein the fastener comprises a sleeve which, on an outer surface thereof, has an all-round ridge positioned essentially in a middle, and a securing screw that passes through the sleeve.

6. The wheel suspension according to claim 1, wherein the fastener is made as one piece and comprises a bearing segment and a connecting segment.

7. The wheel suspension according to claim 6, wherein the bearing segment has a substantially flange-shaped section, which is at least partially in contact with a radially outward-extending section of the first bearing bush component.

8. The wheel suspension according to claim 7, wherein on the bearing segment, on a side facing away from the substantially flange-shaped section, a substantially annular element is fitted, which is at least partially in contact with a radially outward-extending section of the second bearing bush component.

9. A wheel suspension comprising: at least one chassis suspension link, a first track rod, a second track rod, and a deflecting lever connecting the first track rod and the second track rod to one another and being mounted on the at least one chassis suspension link, a bearing system being in a form of a slide bearing which is accommodated by a bearing section of the at least one chassis suspension link, and a fastener connecting the deflecting lever to the at least one chassis suspension link, a first end portion of the fastener being located inside a slide bearing while a second opposed end portion of the fastener threadedly engaging with the deflecting lever for connecting the deflecting lever to the at least one chassis suspension link, and the slide bearing comprises a two-component bearing bush with a first bearing bush component and a second bearing bush component.

10. A wheel suspension comprising: at least one chassis suspension link, a first track rod, a second track rod, and a deflecting lever connecting the first track rod and the second track rod to one another and being mounted on the at least one chassis suspension link, a bearing system being in a form of a slide bearing which is accommodated by a bearing section of the at least one chassis suspension link, and a fastener connecting the deflecting lever to the at least one chassis suspension link, a first end portion of the fastener being unthreaded and located inside a slide bearing for indirectly engaging with the at least one chassis suspension link while a second opposed end portion of the fastener directly and threadedly engaging with the deflecting lever for connecting the deflecting lever to the at least one chassis suspension link, and the slide bearing comprises a two-component bearing bush with a first bearing bush component and a second bearing bush component.

\* \* \* \* \*